May 22, 1945.  H. C. GRANT, JR., ET AL  2,376,353
CONTAINER GAUGE
Filed June 28, 1941    2 Sheets-Sheet 2
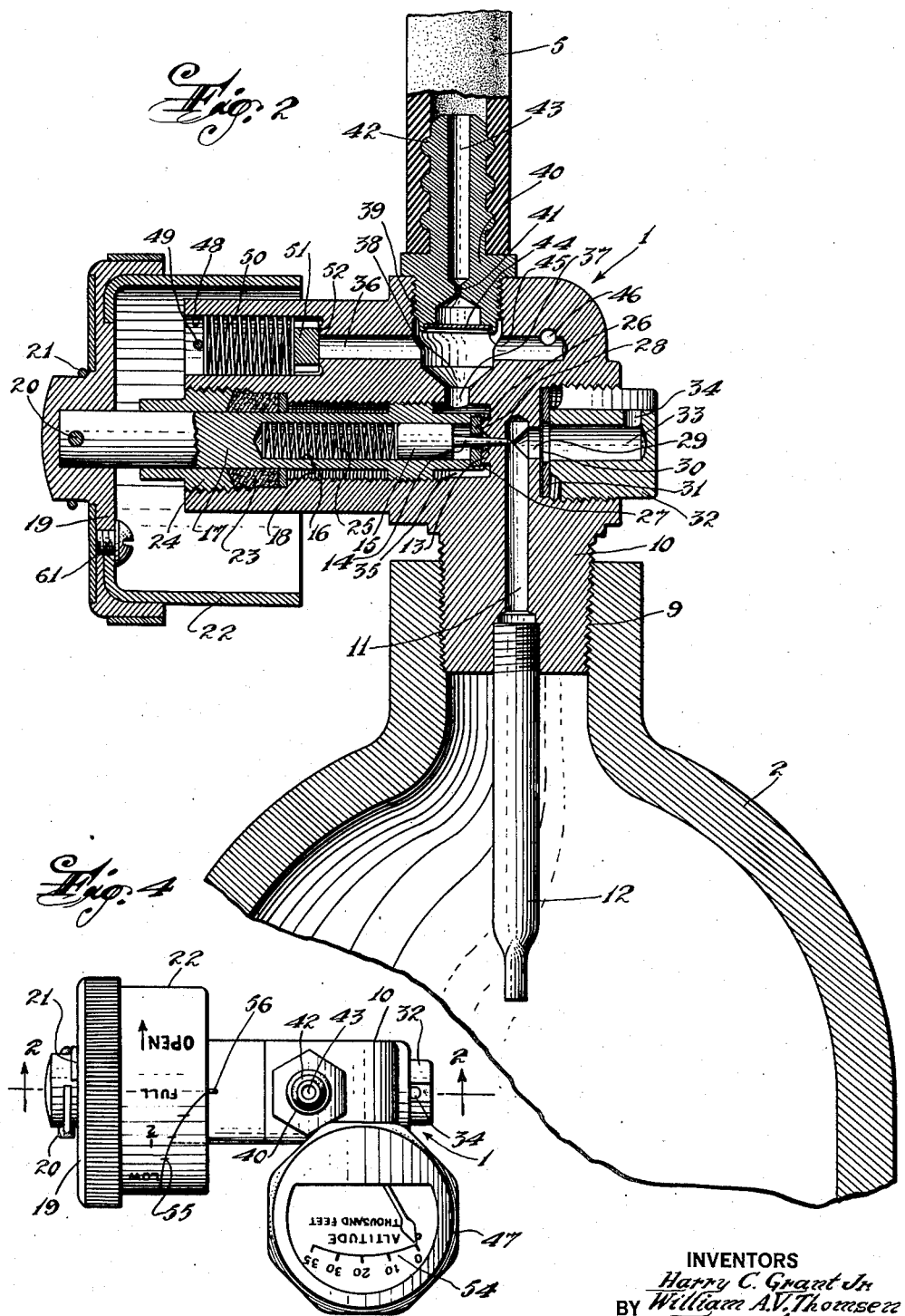
INVENTORS
Harry C. Grant Jr
BY William A.V. Thomsen
Harry J. Moser
ATTORNEY Patented May 22, 1945

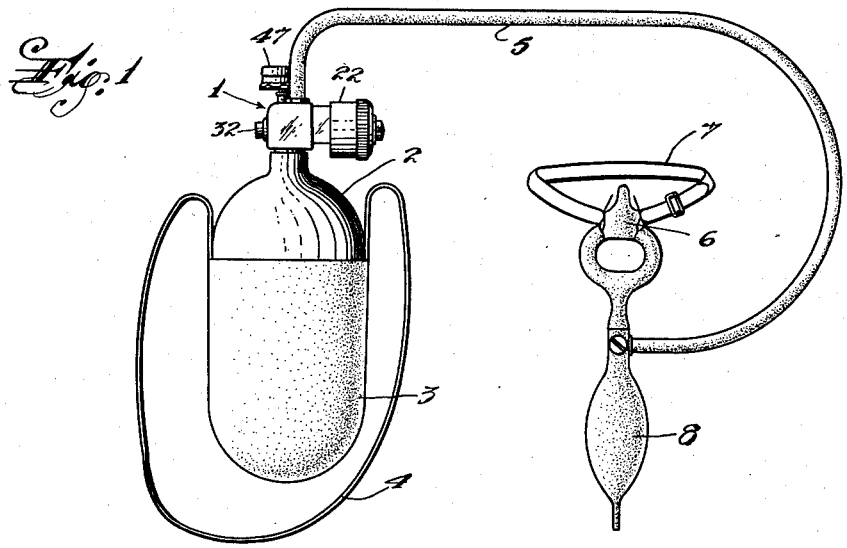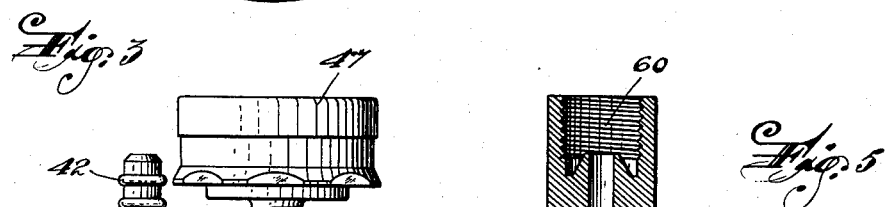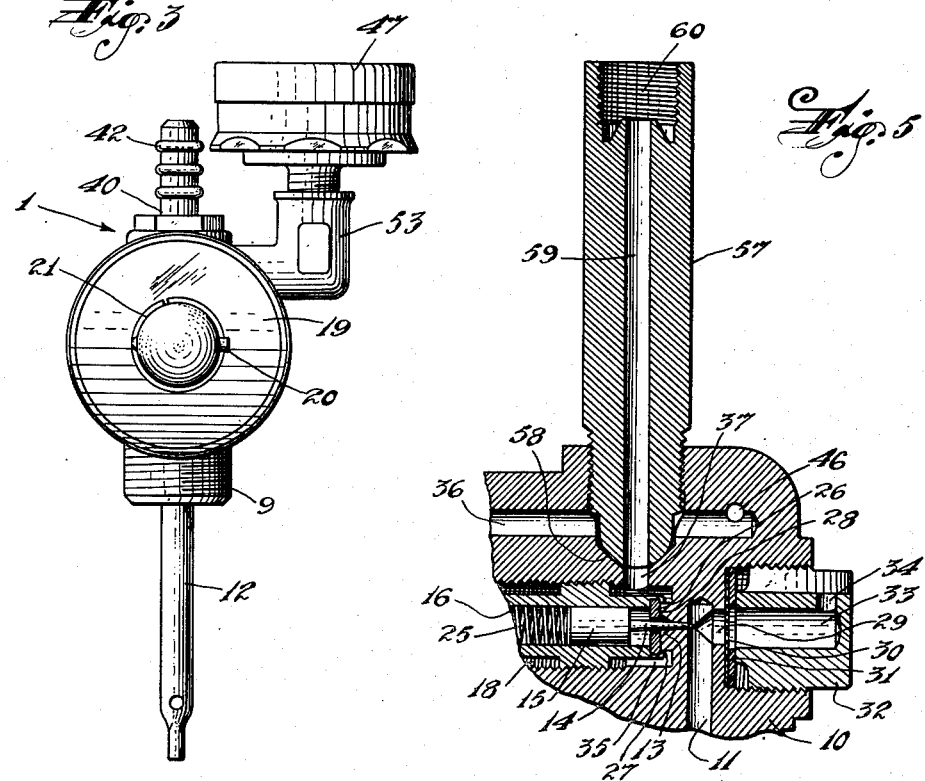

2,376,353

UNITED STATES PATENT OFFICE 2,376,353

CONTAINER GAUGE

Harry C. Grant, Jr., New York, N. Y., and William A. V. Thomsen, Montclair, N. J., assignors to Specialties Development Corporation, Bloomfield, N. J., a corporation of New Jersey Application June 28, 1941, Serial No. 400,174

5 Claims. (Cl. 73—198)

This invention has reference to regulators for controlling and reducing the pressure of gases prior to their use. More particularly, the present invention relates to a flow regulator of this character, which is adapted for controlling the rate of flow of oxygen to a breathing mask in connection with a portable high pressure breathing-oxygen supply as used in aircraft on high altitude flights.

At present, each member of an aircraft crew is required to use fixed oxygen breathing equipment including a regulating valve. This equipment, however, is too bulky to be carried about when such crew member is forced to change his position in the plane during flight.

Accordingly, it is a general object of this invention to provide light-weight portable oxygen breathing equipment which may be carried on the person, and which is equipped with a manually adjustable regulator and with means to indicate the rate of oxygen flow.

Another object of the invention is to provide apparatus for selectively regulating the flow of fluid from a source to means for its utilization in accordance with various conditions at such means, providing an indication in accordance with an effect on the fluid by such regulation in accordance with the selection, and determining the available fluid from the source in response to such regulation irrespective of such conditions.

A more specific object of the invention is to provide a manually adjustable slow rate-of-flow regulator for use with a small high pressure oxygen container carried by the user, and adapted for use with any one of a possible variety of breathing masks.

It is another object of the invention to provide a device of the type referred to, which is manually adjustable in accordance with the altitude at which it is used.

It is still another object to provide a regulator as referred to which may be used as a permanent and substantially leak-proof shut-off for the high pressure oxygen container.

A still further object is to provide a regulator and an indicator therefor in combination with an oxygen container, which is capable of indicating the relative fullness of the container.

These and other objects not specifically enumerated will appear in the following disclosure.

A preferred embodiment of the invention is illustrated in the appended drawings, wherein Figure 1 shows representative oxygen breathing equipment employing the present invention.

Figure 2 is a vertical section through the regulator of the invention mounted on an oxygen container, and showing its relation thereto and to the hose leading to the breathing mask.

Figure 3 is a view in elevation of the regulator, while

Figure 4 is a top plan view thereof.

Figure 5 is a section of a portion of the regulator as in Figure 2, showing the device when used for recharging of the container.

Similar reference numerals indicate like parts in all the figures where they appear.

Having reference to Figure 1, a regulator 1 in accordance with the invention is seen to be mounted on a container 2, which is disposed in a carrying bag 3 having a shoulder strap 4. A supply hose 5 is shown leading from the regulator to a breathing device comprising a mouth and nose piece 6, a head strap 7 and a breathing bag 8.

In the sectional view of the regulator in Figure 2, the container 2, of which only the upper portion is shown, is seen to have threadedly secured to it at 9, a generally elbow-shaped body 10 of the regulator 1. The regulator has an inlet passage 11 into which is secured to syphon tube 12. A metering orifice or passage 13 having a relatively small diameter leads off at right angles to the inlet passage 11. The orifice 13 is controlled by a needle valve 14, which is carried by a supporting member 15. The supporting member 15 is movably disposed in a recess 16 of a valve manipulating member 17, which in turn is threadedly and movably mounted in a recess 18 of the body 10. The member 17 extends outside of the body 10, where it is provided with a handwheel assembly 19. The handwheel assembly 19 is secured to the member 17 by means of a pin 20 and a snap ring 21, which passes through the end of the pin 20 and rides over the extending end thereof as more clearly seen in Figure 4. The handwheel 19 has extending therefrom a transparent skirt 22, which is held secured to the handwheel by means of friction screws 61, enabling the skirt to be rotatably adjusted with respect to the handwheel. The significance of this provision will be explained at another point. The recess 18 is seen to be sealed from the atmosphere by a packing 23 and a packing gland 24. A spring 25 in the recess 16 serves to yieldingly transmit any pressure from the member 17 to the member 15 and the needle valve 14. The recess 16 is closed and the member 15 therein is prevented from falling out by means of a sealing washer 26 which is disposed on a shoulder formed in the recess 16 and held in place by a crimped edge 27 of the member 17. The washer 26, which may consist of rubber or other valve material suitable for this type of application, in coaction with a valve seat 28 formed in the recess 18 about the passage 13 serves to close the inlet passage 11 in addition to the sealing action of the needle valve 14, when the member 17 is screwed down. Undue and deforming closing pressure on the needle valve is avoided, however, due to the provision of a spring 25 disposed intermediate the supporting member 15 and the manipulating member 17.

Opposite to the passage 13 in the inlet passage 11, there is provided a safety outlet 29, which is closed off by a blow-out or safety disc 30. The disc 30 is held in place by an annular washer 31 and an outlet plug 32. An axial passage 33 and a radial passage at 34, formed in the plug 32, provide a relief outlet for the container 1 on the occurrence of excess pressure. An annular space 35 formed between the valve end of the member 17 and the body 10, which space receives fluid medium through the passage 13, communicates with a metering chamber 36 through a connecting and fluid flow restricting passage 37 which is formed within the chamber 36 within a funnel-shaped recess or opening 38. An outlet means receiving recess 39 of the metering chamber 36 is threaded to receive an outlet member 40, which is provided with a calibrated fluid flow throttling outlet passage 41. The member 40 is formed with an extension 42 formed with ridges on its outside to receive thereon and to frictionally hold the end of the supply hose 5. The extension 42 is seen to have an axial fluid conducting passage 43. At 44 is indicated a screen to prevent impurities from reaching the hose 5. The screen 44 is held on a shoulder formed in the member 40 by means of a crimped edge 45 thereof. A passage 46 leads from the chamber 36 to a pressure gauge 47, while the other end of the chamber 36 opens into a recess 48 formed in the body 10, wherein a safety release valve disc 51 is yieldingly held by means of a pin 49 and a spring 50 on to a valve seat 52 formed in the recess 48 adjacent to the chamber 36.

Viewing the regulator, as shown in Figure 3, the device is seen to have connected thereto a pressure gauge 47 by means of a connecting elbow 53.

In Figure 4, it is seen that the gauge 47 has a dial 54 calibrated in thousands of feet altitude, and that the handwheel skirt 22, which is transparent, is provided with an indicating scale 55 showing the relative fullness of the container with respect to a reference mark 56 on top of the body 10.

In Figure 5, the outlet member 40 is shown to be replaced by a charging adapter 57, the nose or discharging end 58 of which is so shaped as to make intimate contact with the funnel-shaped opening or recess 38, thus providing a leak-proof passage for fluid entering the regulator through an axial passage 59 of the adapter 57. The adapter 57 is provided with a threaded recess 60 for the reception of charging means, not shown.

Figure 2 shows the needle valve 14 in its completely closed position. When the handwheel 19 is turned down completely, the needle valve 14 seats in the metering orifice 13, effectively shutting off the flow of oxygen from the container. It is possible, however, for a slight leakage to exist past this type of seal, and in order to prevent such leakage the auxiliary shut-off valve 26 and the corresponding valve seat 28 are provided. For a final storage or shut-off position, the handwheel is turned down completely so that the valve disc 26 is pressed on to the valve seat 28. Thus, if any leakage exists past the needle valve, there will be no loss of gas, since the valve 26 will prevent any further seepage of the fluid.

The needle valve 14 is freely floating with respect to the manipulating member 17, being held down by the spring 25, which limits the amount of compression which may exist between the needle valve and its seat. This arrangement is quite important since it is necessary to protect the needle valve against distortion due to the application of excessive torques through the handwheel. It is also for this reason, namely the limitation set upon the seating pressure of the needle valve, and in view of the rather high pressure under which oxygen is stored in the container, that the needle valve alone is inadequate to provide a secure seal, and that the auxiliary shut-off valve 28 becomes necessary.

In operating the device, when a discharge of the oxygen is desired, the handwheel 19 is turned, until the sealing washer 26 picks up the valve supporting member 15. The needle valve 14 and the auxiliary valve having been unseated, oxygen is free to flow from the container 2 through the metering orifice 13, through passage 37, chamber 36 and out through passages 41 and 43 toward the breathing mask 6. The rate of flow through the orifices 13 and 41 may be ascertained by reading the pressure maintained in the metering chamber 36 on the low pressure gauge 47. Since the pressure in the chamber 36 is a function of the inflow and the outflow, it is also an indicator of the rate of flow through the metering chamber. It will be seen that the pitch of the thread on the manipulating member 17, the angle of the needle valve 14, the size of the orifices 13 and 41, and the range of pressures measurable on the gauge 47 determine the rate-of-flow range of the unit. For very low rates of flow, the passage 37 may be decreased in size to further retard the flow. Since the rate of flow, which is desirable at any one time, is dependent on the respective altitude, the gauge dial is conveniently calibrated in thousands of feet altitude. The gauge used is of the low pressure variety (15 lbs. per sq. in. maximum), while the pressure in the cylinder may be as high as 2000 lbs. per sq. in. It will be obvious, therefore, that the gauge may be readily damaged if a stoppage should occur in the outlet of the regulator while the needle is off its seat. For this reason, the safety valve 51 is provided, shown disposed to the left of the metering chamber 36. This is a simple check valve held seated by the spring 50, which is calibrated to yield if the pressure in the metering chamber is slightly above 15 lbs. per sq. in. This safety valve is so proportioned that when the needle valve is wide open and the maximum pressure exists in the storage cylinder, and the discharge from the outlet connection is blocked, the rate of loss of the gas through the safety valve is sufficient to prevent the building up of pressure in the metering chamber beyond that which the pressure gauge can safely withstand.

Since the present regulator is used for emergency purposes, and is ordinarily employed in connection with a small cylinder, means have been provided by which the operator is enabled to tell the approximate quantity of oxygen remaining in his supply tank. To this end, the handwheel is provided with the transparent skirt 22, on which the curved line 55 is marked.

If the operator desires to know the approximate quantity of gas remaining in his container, he adjusts the needle valve 14 so that the gauge indicates the 20,000 ft. mark and observes where the curved line on the rim crosses the datum mark 56 on the valve body 10. This curved line is suitably marked to indicate if the cylinder is full, ¾, ½, ¼ full or low, the indication being merely an approximation. Setting the gauge for a 20,000 ft. indication, actually sets the pressure in the metering chamber, which, in turn, sets the correct rate of flow for the conditions under which the handwheel mark was determined. The opening of the handwheel for obtaining this standard rate of flow varies with the pressure in the cylinder, and since this pressure, in turn, varies with the quantity of gas remaining in the cylinder, an approximate measure of the cylinder contents is obtained thereby. To render practicable the proper alignment of the calibration marks on the skirt and the valve body, the skirt is made adjustable with respect to the handwheel, by mounting it to the handwheel hub portion by means of the friction screws 61 which permit rotative adjustment of the skirt, as required, to obtain the proper setting with respect to the handwheel.

In recharging, the outlet member 40 is removed and the charging adapter 57 is screwed securely into its place. This causes the adapter nose 58 to seal against the funnel-shaped opening 38 of the metering chamber, sealing off the passages toward the safety valve 51 and the gauge 47, and permitting the direct application of the high pressure oxygen as required for the recharging of the container. If this nose and funnel connection should leak somewhat, however, the safety valve 51 will still protect the gauge against excessive pressures in the metering chamber 36.

From the foregoing, it will be apparent that, while a specific embodiment of the invention has been described, certain modifications in the construction may be made without departing from the scope of the invention as defined by the appended claims.

What we claim is:

1. In combination, a container for the storage of fluid medium, a flow control device attached to said container and having valve means for regulating the flow of medium from the container through said device, means restricting the fluid path downstream of said valve means, manual means to adjustably operate said valve means, a gauge connected to said device between the valve means and the restricting means for establishing a value indicative of a given normal rate of flow of medium through said device, a scale calibrated in fractions of volume of the container carried on said manual means and movable with the latter and relative to said device, and a scale mark carried on said device and correlated with said scale to indicate a reading thereon whereby adjustment of said manual means to achieve said rate of flow in accord with said value functions to establish a reading on said scale indicative of the relative fullness of said container.

2. In combination, a container for the storage of fluid medium, a flow control device attached to said container and having valve means adapted to regulate the flow of medium from the container through the device, means restricting the fluid path downstream of said valve means, manual means to adjustably operate the valve means, indicia means connected to said device between the valve means and the restricting means for indicating a given normal rate of flow through the device, and indicia means on said device and said manual means calibrated in fractions of volume of the container and operatively associated with said first mentioned indicia means for denoting the achievement of said given rate of flow, whereby, the relative fullness of the container may be ascertained.

3. In a continuous flow control device for attachment to a container and having valve means adapted to regulate the flow from the container through the device, the combination of means restricting the fluid path downstream of said valve means, manual means to adjustably operate the valve means, indicia means on said device between the valve means and the restricting means for indicating a given normal rate of flow through the device, and means carried by said device and said manual means calibrated in fractions of volume of the container and operatively associated with said indicia means for denoting the achievement of said given rate of flow, whereby the relative fullness of the container may be ascertained.

4. In combination, storage means for fluid, flow control means including valve means for regulating the flow of fluid from the storage means through the control means, means restricting the fluid path downstream of said valve means, means for adjusting the valve means, means between said valve means and the restricting means for indicating given normal flow rate of the fluid through the control means, scale means calibrated in fractions of volumes of the storage means and movable in response to movement of the adjusting means, indicia means correlated to said scale means to indicate reading whereby adjustment of the adjusting means to achieve said normal rate of flow functions to establish reading indicative of the relative fullness of the storage means.

5. In combination, fluid source means, fluid utilization means, means for conducting fluid from said source means to said utilization means, means having a selection of positions for regulating the flow of fluid in said conducting means in accordance with various conditions at said utilization means, means communicating with said conducting means for giving an indication in accordance with an effect on the fluid by said regulating means according to said selection, and means responsive to operation of said regulating means according to a given selection for determining the available fluid from said source irrespective of said conditions.

HARRY C. GRANT, Jr.
WILLIAM A. V. THOMSEN.